(12) United States Patent
Chaifetz

(10) Patent No.: US 10,247,238 B1
(45) Date of Patent: Apr. 2, 2019

(54) SLIDING TRACK ASSEMBLY

(71) Applicant: Guy R. Chaifetz, Marietta, GA (US)

(72) Inventor: Guy R. Chaifetz, Marietta, GA (US)

( * ) Notice: Subject to any disclaimer, the term of this patent is extended or adjusted under 35 U.S.C. 154(b) by 0 days.

(21) Appl. No.: 15/938,364

(22) Filed: Mar. 28, 2018

(51) Int. Cl.
  *F16C 29/02* (2006.01)
  *A47B 88/48* (2017.01)
  *A47B 88/473* (2017.01)
  *A47B 88/483* (2017.01)

(52) U.S. Cl.
  CPC .......... *F16C 29/02* (2013.01); *A47B 88/473* (2017.01); *A47B 88/483* (2017.01); *F16C 2314/72* (2013.01)

(58) Field of Classification Search
  CPC ........ F16C 29/005; F16C 29/02; F16C 29/10; F16C 2314/72; A47B 88/40; A47B 88/401; A47B 88/483; A47B 88/473; B66F 9/141
  See application file for complete search history.

(56) References Cited

U.S. PATENT DOCUMENTS

| | | | | |
|---|---|---|---|---|
| 4,305,625 A * | 12/1981 | Gutner | ................. | A47B 88/483 312/334.39 |
| 5,292,198 A * | 3/1994 | Rock | ...................... | A47B 88/43 312/333 |
| 5,570,957 A * | 11/1996 | Kuly | ...................... | A63B 23/00 384/42 |
| 5,681,116 A * | 10/1997 | Lin | .................... | A47B 21/0314 108/140 |
| 6,158,123 A * | 12/2000 | Bryson | ................... | B23P 15/00 29/434 |
| 2002/0093734 A1* | 7/2002 | Mauro | ..................... | B23Q 1/58 359/393 |
| 2002/0181809 A1* | 12/2002 | Moshammer | .......... | F16C 29/02 384/40 |
| 2003/0099414 A1* | 5/2003 | Okabe | ..................... | F16C 29/02 384/42 |
| 2005/0215298 A1* | 9/2005 | Lee | ..................... | H04M 1/0237 455/575.4 |
| 2006/0269175 A1* | 11/2006 | Lin | ........................ | F16C 29/00 384/26 |
| 2012/0049601 A1* | 3/2012 | von Rothkirch und Panthen ....... | | F16C 29/123 297/411.2 |

(Continued)

FOREIGN PATENT DOCUMENTS

EP           790420 A2 *   4/2015
WO   WO2015078765 A1 *   8/1997

*Primary Examiner* — Alan B Waits
(74) *Attorney, Agent, or Firm* — Inventions International Inc.; Tiffany C. Miller

(57) ABSTRACT

A sliding track assembly with a first structure having first and second opposing pairs of convex rails connected to a surface of a compartment of the first structure. The sliding track assembly has a second structure having first and second opposing pairs of rail guide recesses located on an outer wall surface of the second structure. The first and second opposing pairs of convex rails of the first structure are aligned with the first and second opposing pairs of rail guide recesses of the second structure. An opening of the first structure receives an end of the second structure. The second structure slidably traverses a length of the first structure when the first opposing pair of convex rails are aligned with the first opposing pair of rail guide recesses and when the second opposing pair of convex rails are aligned with the second opposing pair of rail guide recesses.

19 Claims, 15 Drawing Sheets

(56) References Cited

U.S. PATENT DOCUMENTS

2014/0321778 A1* 10/2014 Buchnnann .............. B66F 9/141
                                                        384/26
2017/0175811 A1*  6/2017 Zimmermann ...... A47B 88/483
2017/0341092 A1* 11/2017 Yoshida .................. B05B 1/005
2018/0066706 A1*  3/2018 Yen ....................... F16C 29/005

* cited by examiner

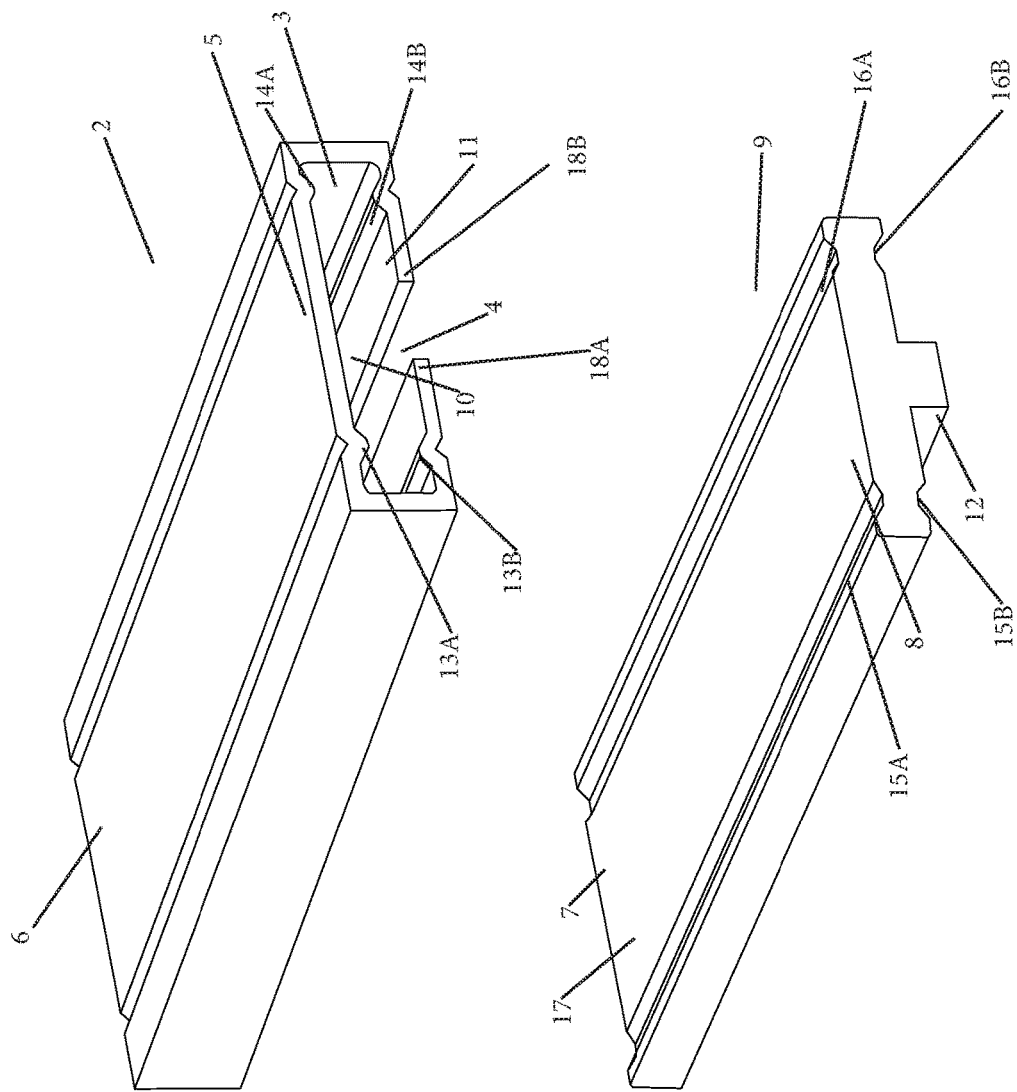

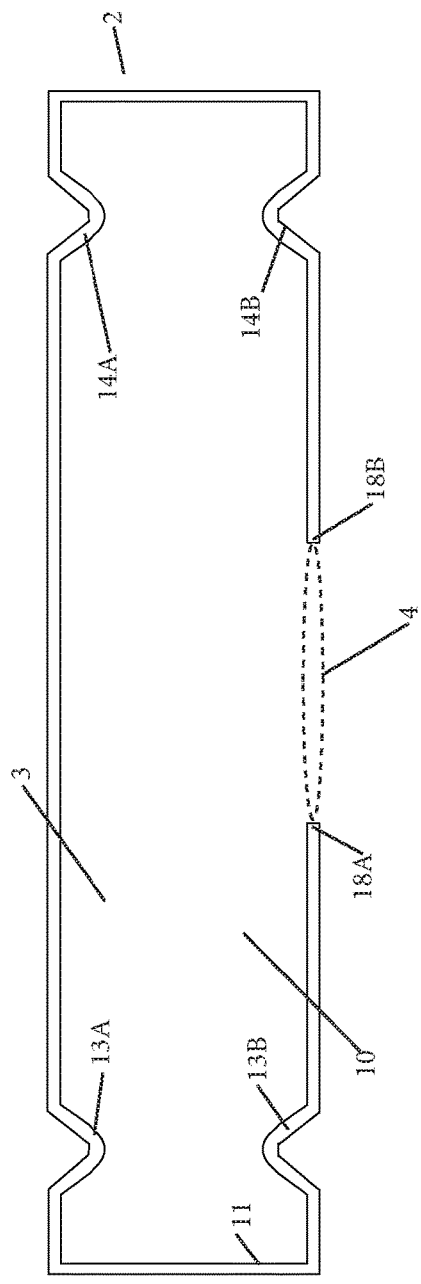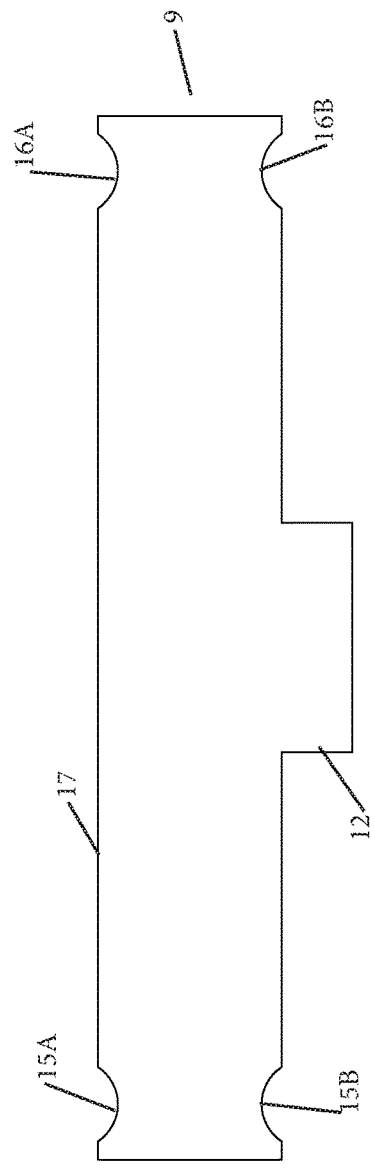

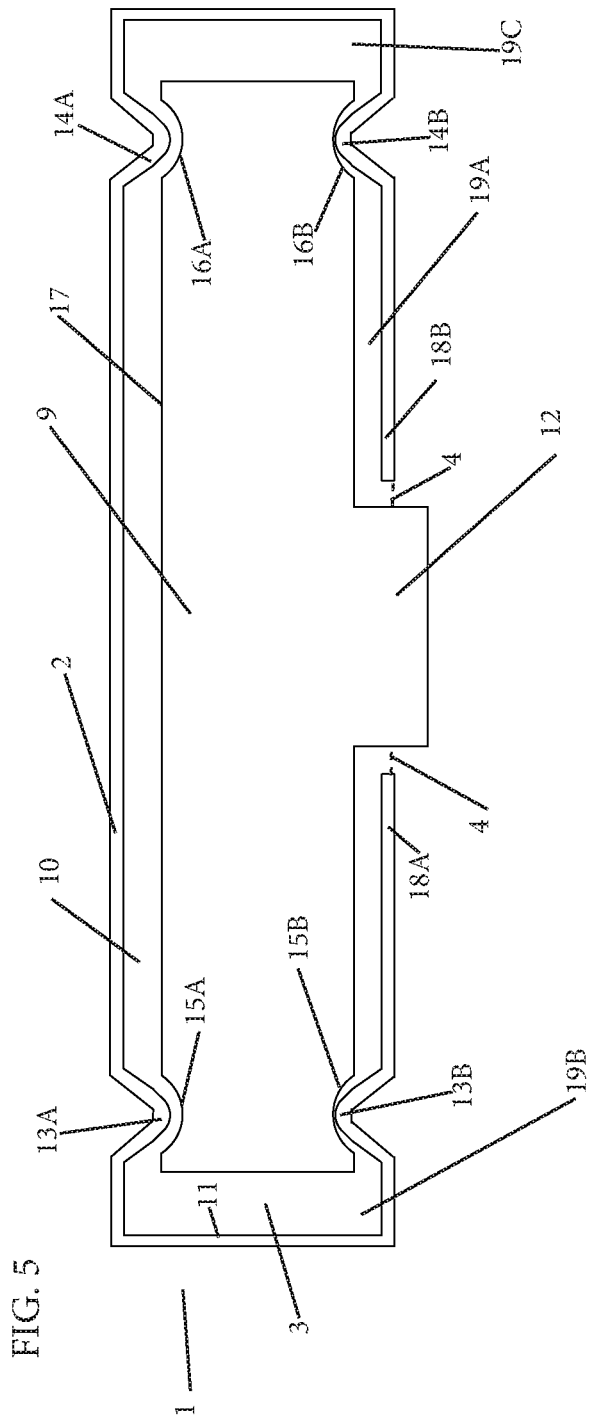

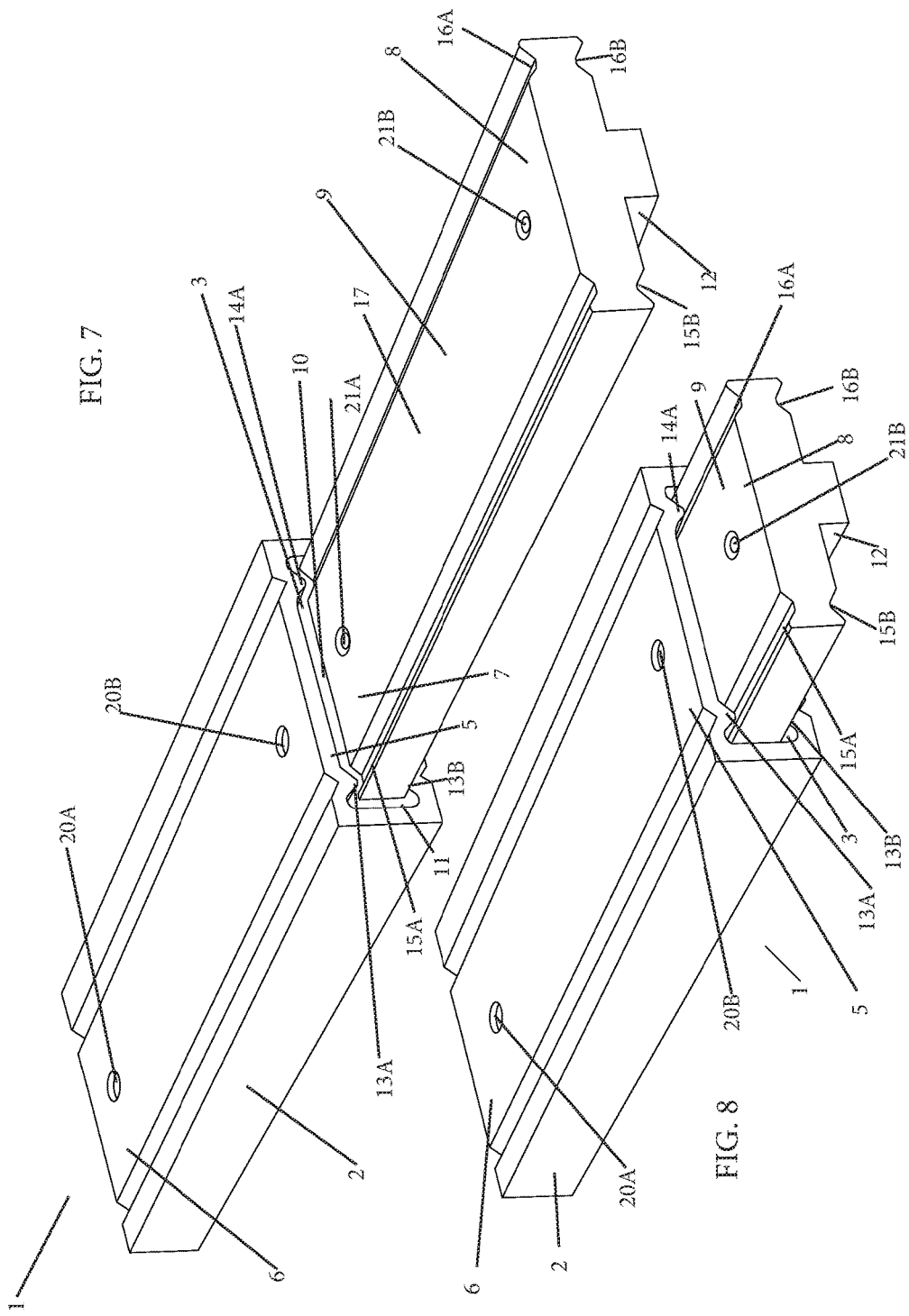

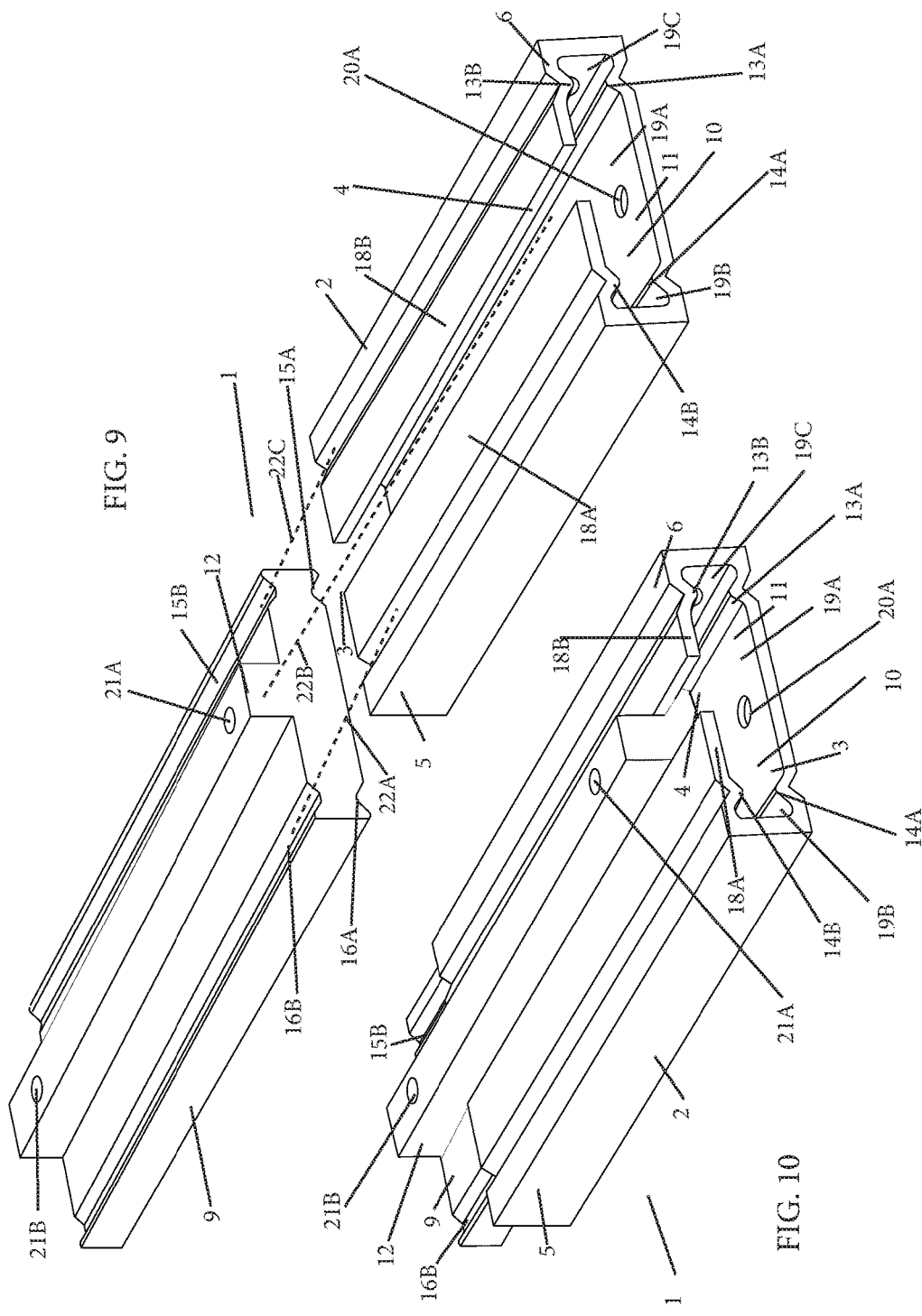

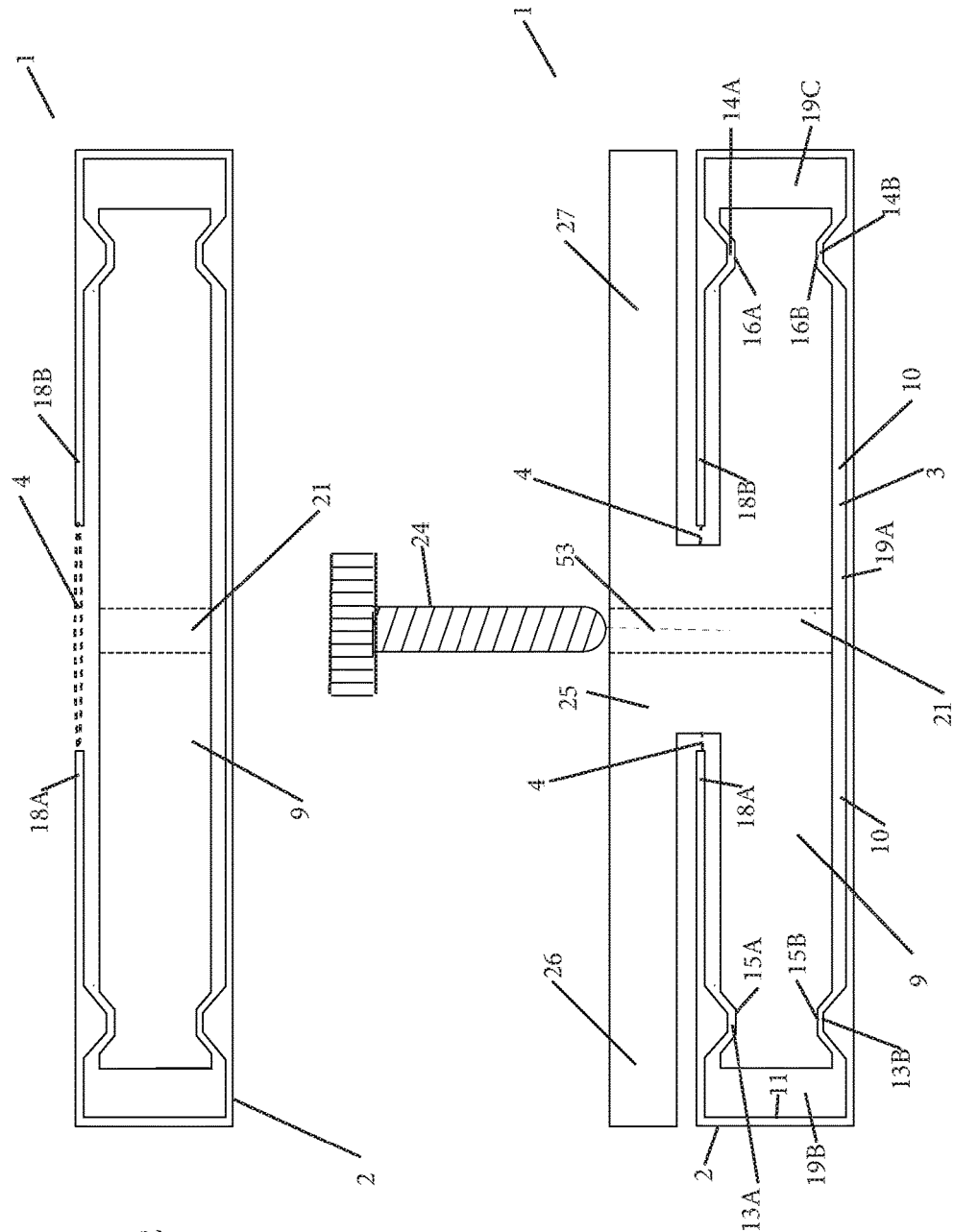

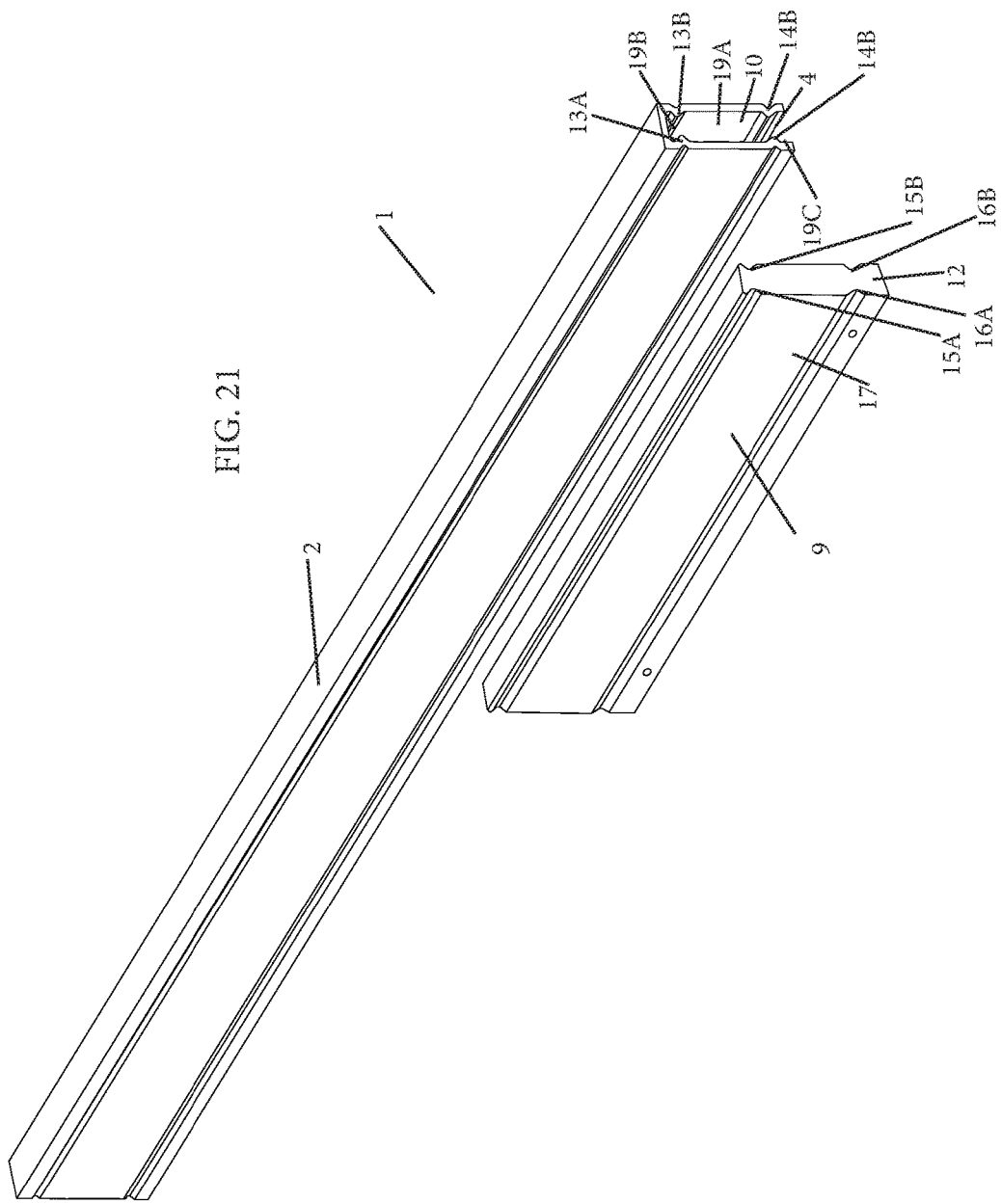

SLIDING TRACK ASSEMBLY

BACKGROUND OF THE INVENTION

1. Field of the Invention

This invention relates, generally, to a sliding track assembly. More particularly, it relates to a sliding track assembly having a first structure having two opposing pairs of convex rails aligned with two opposing pairs of rail guide recesses of a second structure.

2. Background Art

The vast majority of slide track assemblies for drawers having ball bearings or wheels are used to connect a drawer to a cabinet. In a first example, epoxy coated drawer slides have one slide connected to a drawer and another slide connected to a cabinet. These drawer slides have wheels that help the two slides slidably traverse each other. In a second example, ball bearing drawer slides are capable of bearing more weight and a two-part slide allows for full extension of a drawer from the drawer frame. The problem relating to friction occurs when the entire surface of a first track slides across a second track. It is more desirable to have the least amount of friction to increase the ease of expanding and retracting the drawer from a cabinet. Thus, there is a need for a first track to have less points of contact on a second track to reduce friction.

Currently, the addition of ball bearings, rollers, or wheels to a slide track assembly significantly decreases or eliminates the friction created from this sliding action. However, the use of these additional parts including, but not limited to, ball bearings, rollers, or wheels pose numerous problems. The first problem is the wear and tear from use on these additional parts which may in turn render the slide track assembly inoperable for its intended use. The second problem is the additional cost of the parts and the additional costs and time associated with the assembly of these parts during manufacturing. It is more desirable to maintain the substantially frictionless characteristic of these sliding tracks, yet, eliminating the need to have these additional moving parts. Thus, there is a need to have fewer moving parts in a sliding track assembly to lower the costs of parts and assembly of these slide track systems.

In a third problem that arises in current slide track assemblies available in today's market, is that these tracks are made of metal. A metal slide track assembly is more suitable for indoor applications and is not capable of withstanding a marine environment. There is a need to incorporate slide track assemblies in a marine environment, including, but not limited to, on marine vessels, or on marine recreation structures such as kayaks, canoes, or paddle boards. In an example, it would be more desirable for a sliding track assembly to be capable of connecting a container or a seat to a paddle board. The container or seat can be adjusted to a desired position along the sliding track assembly and then can be locked into place. In this example, the sliding track assembly of the paddle board will be in contact with water including, but not limited to, fresh water or salt water. When the metal slides and additional components such as rollers, wheels, or ball bearings are exposed to salt water, corrosion of the movable parts, or even corrosion of the entire sliding track assembly may occur. As a result of this corrosion, the container or seat will no longer be able to slidably traverse the track of the paddle board, rendering the sliding track assembly inoperable for its intended purpose. It is more desirable for a sliding track assembly to be functionally operable in a salt water environment and even be fully functional when completely immersed in salt water. Thus, there is a need to eliminate the metal material of the existing slide track assemblies and to eliminate the need to have additional roller parts.

However, in view of the prior art considered as a whole at the time the present invention was made, it was not obvious to those of ordinary skill in the pertinent art how the identified needs could be fulfilled.

SUMMARY OF THE INVENTION

The long-standing but heretofore unfulfilled need for a sliding track assembly having a first structure with first and second opposing pairs of convex rails connected to an inner wall surface of a compartment of the first structure. The sliding track assembly has a second structure having first and second opposing pairs of rail guide recesses located on an outer wall surface of the second structure. The first and second opposing pairs of convex rails of the first structure are aligned with the first and second opposing pairs of rail guide recesses of the second structure. An opening of the first structure receives an end of the second structure. The second structure slidably traverses at least a portion of a length of the first structure when the first opposing pair of convex rails of the first structure are aligned with the first opposing pair of rail guide recesses of the second structure and when the second opposing pair of convex rails of the first structure are aligned with the second opposing pair of rail guide recesses of the second structure which also includes improvements that overcome the limitations of prior art sliding track assemblies is now met by a new, useful, and non-obvious invention.

The invention includes a sliding track assembly with a first structure having a first end located opposite a second end. The first structure has a compartment. The compartment of the first structure has a central portion located between two end portions. The central portion of the compartment has a size greater than a size of each of the two end portions. The compartment has a first opening located on at least one end of the first structure. The compartment has an inner wall surface. A second structure has a first end located opposite a second end. The second structure has an outer wall surface. A first opposing pair of convex rails are connected to an inner wall surface of the compartment of the first structure. A second opposing pair of convex rails are connected to an inner wall surface of the compartment of the first structure. A first opposing pair of rail guide recesses are located on an outer wall surface of the second structure. A second opposing pair of rail guide recesses are located on an outer wall surface of the second structure.

The first opening of the first structure receives an end of the second structure. The second structure slidably traverses at least a portion of a length of the first structure when the first opposing pair of convex rails of the first structure are aligned with the first opposing pair of rail guide recesses of the second structure and when the second opposing pair of convex rails of the first structure are aligned with the second opposing pair of rail guide recesses of the second structure. At least a portion of the second structure is retained within the compartment of the first structure when the second structure slidably traverses at least a portion of the length of the first structure.

In an alternate embodiment, the second structure has a mounting leg. The mounting leg protrudes from the outer wall surface of the second structure.

In an alternate embodiment, the first structure has a second opening configured to receive the mounting leg of the second structure. Alternatively, rather than the second opening of the first structure receiving a mounting leg of the second structure, the second opening of the first structure can receive a fastener including, but not limited to, a lock knob, a screw, or a turn screw connected to the second structure.

In another embodiment, the first structure has a first flange. The first flange borders at least a portion of the second opening. The first flange is located opposite a second flange. The second flange borders at least a portion of the second opening.

In another embodiment, the second structure has a mounting leg. The mounting leg protrudes from the outer wall surface of the second structure. The mounting leg is positioned between the first flange of the first structure and the second flange of the first structure when the second structure is received by the first opening of the first structure. At least a portion of the mounting leg protrudes from the second opening of the first structure.

In a preferred embodiment, the first opposing pair of convex rails and the second opposing pair of convex rails are integrally formed within the first structure. It is also within the scope of this current invention for the first opposing pair of convex rails and the second opposing pair of convex rails to be separate parts connected thereto.

In an alternate embodiment, the first structure has a third opening. The third opening is located opposite the first opening of the first structure. This third opening allows the second structure to slidably traverse beyond the entire length of the first structure.

In an alternate embodiment, the first structure has at least one central bore. The at least one central bore of the first structure receives a removable fastener including, but not limited to, a screw or a nail.

In an alternate embodiment, the second structure has at least one central bore, the at least one central bore of the second structure receives a removable fastener including, but not limited to, a screw or a nail.

In an alternate embodiment, the second structure has a t-mount leg. The t-mount leg protrudes from the outer wall surface of the second structure. The t-mount leg is positioned between the first flange of the first structure and the second flange of the first structure when the second structure is received by the first opening of the first structure. At least a portion of the t-mount leg protrudes from the second opening of the first structure. The t-mount leg has a first protrusion positioned adjacent to and parallel to the first flange located opposite a second protrusion positioned adjacent to and parallel to the second flange.

In an alternate embodiment, the mounting leg of the second structure is connected to a third structure. The third structure has a first end located opposite a second end. The third structure has an outer wall surface. A third opposing pair of rail guide recesses are located on an outer wall surface of the third structure. A fourth opposing pair of rail guide recesses are located on the outer wall surface of the third structure. A fourth structure has a first end located opposite a second end. The fourth structure has a compartment. The compartment of the fourth structure has a first opening located on at least one end of the fourth structure. The fourth structure has a second opening. The compartment of the fourth structure has an inner wall surface. A third opposing pair of convex rails are connected to the inner wall surface of the compartment of the fourth structure. A fourth opposing pair of convex rails are connected to the inner wall surface of the compartment of the fourth structure. The first opening of the fourth structure receives an end of the third structure. The third structure slidably traverses at least a portion of a length of the fourth structure when the third opposing pair of convex rails of the fourth structure are aligned with the third opposing pair of rail guide recesses of the third structure and when the fourth opposing pair of convex rails of the fourth structure are aligned with the fourth opposing pair of rail guide recesses of the third structure. At least a portion of the third structure is retained within the compartment of the fourth structure when the third structure slidably traverses at least a portion of the length of the fourth structure. The fourth structure has a first flange bordering at least a portion of the second opening of the fourth structure. The first flange is located opposite a second flange. The second flange borders at least a portion of the second opening of the fourth structure.

In an alternate embodiment, the sliding track assembly has a lock mechanism connected thereto. The lock mechanism can have a lever connected to the first structure. The lever is hingedly pivotable at a fulcrum point. A first end of the lever is connected to a resilient member including, but not limited to, a spring. A second end of the lever is connected to a protrusion. The first structure has a protrusion receiving opening aligned with a protrusion receiving opening of the second structure, whereby, the sliding track assembly is oriented in a locked orientation when the protrusion is received by the protrusion receiving opening of the first structure and the protrusion receiving opening of the second structure. The sliding track assembly is oriented in an unlocked orientation when the lever is depressed, thereby, removing the protrusion from the protrusion receiving opening of the first structure and from the protrusion receiving opening of the second structure.

In an alternate embodiment, the sliding track assembly has a lock mechanism connected thereto. The lock mechanism can have a plate. A first end of the plate is connected to the first structure by a fastener including, but not limited to a screw. A second end of the plate has a handle or grasping portion. The plate is connected to a protrusion. The first structure has a protrusion receiving opening aligned with a protrusion receiving opening of the second structure, whereby, the sliding track assembly is oriented in a locked orientation when the protrusion is received by the protrusion receiving opening of the first structure and the protrusion receiving opening of the second structure. The sliding track assembly is oriented in an unlocked orientation when the handle of the plate is raised, thereby, removing the protrusion from the protrusion receiving opening of the first structure and from the protrusion receiving opening of the second structure.

In a preferred embodiment, the sliding track assembly including the first structure and the second structure are made of a non-corrosive material including, but not limited to, plastic. Although it is a preferred embodiment for the slide track assembly to be made of a material being plastic, it is within the scope of this invention for the slide track assembly to be made of any material such as composite, plastic, metal, or ceramic.

BRIEF DESCRIPTION OF THE DRAWINGS

For a fuller understanding of the nature and objects of the invention, reference should be made to the following detailed description, taken in connection with the accompanying drawings, in which:

FIG. 1 is a top perspective view of the first structure of the novel sliding track assembly;

FIG. 2 is a top perspective view of the second structure of the novel sliding track assembly having a mounting leg;

FIG. 3 is a side cut-away view of the first structure of the novel sliding track assembly having a first and second opposing pair of convex rails connected to an inner wall surface of the compartment of the first structure;

FIG. 4 is a side cut-away view of the second structure of the novel sliding track assembly having a mounting leg;

FIG. 5 is a side cut-away view of the novel sliding track assembly having the second structure with a mounting leg retained within the compartment of the first structure;

FIG. 7 is a top perspective view of the novel sliding track assembly having an end of the second structure being aligned with the compartment first opening of the first structure;

FIG. 8 is a top perspective view of the novel sliding track assembly having a second structure being received by the compartment first opening of the first structure;

FIG. 9 is a rear exploded view of the novel sliding track assembly having an end of the second structure being aligned with the compartment first opening of the first structure and the mounting leg of the second structure being aligned with the second opening of the first structure;

FIG. 10 is a rear perspective view of the novel sliding track assembly having an end of the second structure received by the compartment first opening of the first structure and the mounting leg of the second structure being received by the second opening of the first structure;

FIG. 12 is a side cut-away view of the novel sliding track assembly having the second structure without a mounting leg and being retained within the compartment of the first structure;

FIG. 13 is a side cut-away view of the novel sliding track assembly having the second structure with a t-mount leg and being retained within the compartment of the first structure;

DETAILED DESCRIPTION OF THE PREFERRED EMBODIMENT

Figure 6:
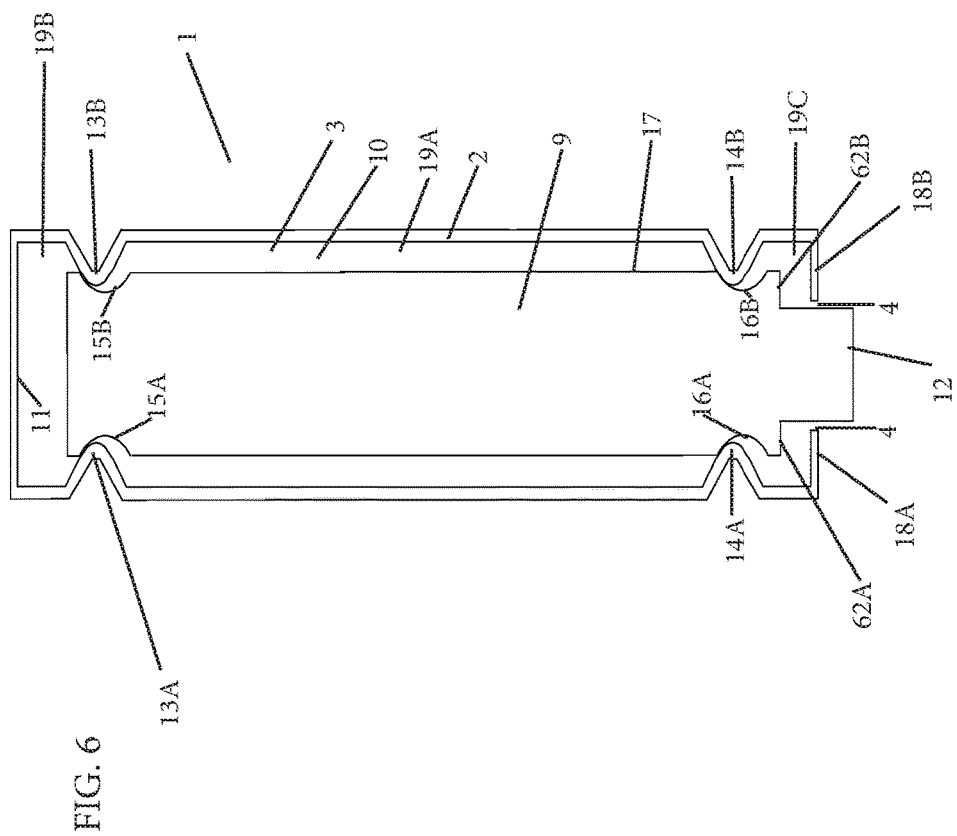
FIG. 6 is a side cut-away view of an alternate embodiment of the novel sliding track assembly having the second structure retained within the compartment of the first structure.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

In a general embodiment the novel sliding track assembly has a first structure and a second structure. The first structure has a first opposing pair of convex rails and a second opposing pair of convex rails. The second structure has a first opposing pair of rail guide recesses and a second opposing pair of rail guide recesses. An opening of the first structure receives an end of the second structure. The second structure slidably traverses at least a portion of a length of the first structure when the first opposing pair of convex rails of the first structure are aligned with the first opposing pair of rail guide recesses of the second structure and when the second opposing pair of convex rails of the first structure are aligned with the second opposing pair of rail guide recesses of the second structure. The sliding track assembly is made of a plastic outer track and a plastic inner slide portion.

Construction of the Novel Sliding Track Assembly

Referring now to FIG. 5, it will be seen that the reference numeral 1 denotes an illustrative embodiment of the novel sliding track assembly as a whole. In the embodiment in FIG. 5, secondary structure 9 has mounting leg 12. Mounting leg 12 protrudes from second structure 9. It is within the scope of this invention for mounting leg 12 to be integrally formed within second structure 9, to be connected to second structure 9, or to be a fastener including, but not limited to, a screw, a turn screw, or a knob. Novel sliding track assembly 1 is made by interconnecting first structure 2 with second structure 9. Second structure 9 has a first opposing pair of rail guide recesses 15A and 15B being located on an outer wall surface 17 of second structure 9. A second opposing pair of rail guide recesses 16A and 16B are located on an outer wall surface 17 of second structure 9.

It is within the scope of this invention for either the first structure 2 to be mounted to a first anchoring structure and for the second structure 9 to be mounted to a second anchoring structure. It is within the scope of this invention for an anchoring structure to include but not be limited to a wall, a paddle board, a cabinet, a drawer, a seat, a container, or a ground surface. Secondary structure 9 can slidably traverse first structure 2 or first structure 2 can slidably traverse secondary structure 9 depending on the mounting configuration.

FIG. 2 shows secondary structure 9 having first end 7 located opposite second end 8. Second structure 9 has outer wall surface 17. FIGS. 2 and 4 illustrate second structure 9 having a first opposing pair of rail guide recesses 15A and 15B being located on an outer wall surface 17 of second structure 9. A second opposing pair of rail guide recesses 16A and 16B are located on an outer wall surface 17 of second structure 9. FIGS. 2, 4, 5, 6-11, 14-15 best show second structure 9 has mounting leg 12.

FIGS. 1, 3, 5-11, 13, and 17 illustrate first structure 2 having a first opposing pair of convex rails 13A and 13B and a second opposing pair of convex rails 14A and 14B (FIGS. 1, 3, 5-6, 9-11, 13, and 17). The convex rails 13 and 14 may be integrally formed within first structure 2 or may be connected to any inner wall surface 11 of compartment 10. The convex rails can have a radius. First structure 2 has compartment 10. FIGS. 1, 3, 5-7, 9-10, 13, and 17 show compartment 10 having inner wall surface 11. First structure 2 has first opening 3 and second opening 4 (FIGS. 1, 3, 5-6, 9-11, 13, and 17). FIG. 5 best depicts compartment 10 of first structure 2 having central portion 19A, end portion 19B located opposite end portion 19C. Central portion 19A of compartment 10 has a greater size than end portions 19B and 19C because it retains the larger portion of second structure 9. First structure 2 has first flange 18A and second flange 18B.

FIGS. 1, 7, and 8-10 best illustrate first structure 2 having first end 5 located opposite second end 6. FIGS. 1, 3, 5, and 9 best shows first structure 2 having first flange 18A and second flange 18B bordering second opening 4 of first structure 2 being located between first opposing pair of convex rails 13A and 13B and a second opposing pair of convex rails 14A and 14B. This configuration orients mounting leg 12 in central portion 19A of compartment 10 and through second opening 4 of first structure 2 at a location between first opposing pair of convex rails 13A and 13B and a second opposing pair of convex rails 14A and 14B.

FIG. 6 shows first structure 2 having first flange 18A and second flange 18B bordering second opening 4 of first structure 2 not being located between first opposing pair of convex rails 13A and 13B and a second opposing pair of convex rails 14A and 14B. This configuration orients mounting leg 12 in either end portion 19B or 19C of compartment 10 and through second opening 4 at a location on an end of first structure 2. Second structure 9 has a first opposing pair of rail guide recesses 15A and 15B being located on an outer wall surface 17 (FIGS. 6-7) of second structure 9. A second opposing pair of rail guide recesses 16A and 16B are located on an outer wall surface 17 of second structure 9.

FIG. 7 depicts first opening 3 of first structure 2 receiving an end 7 of second structure 9. Secondary structure 9 has first end 7 located opposite second end 8. Second structure 9 slidably traverses at least a portion of a length of first structure 2 when first opposing pair of convex rails 13A and 13B of first structure 2 are aligned with first opposing pair of rail guide recesses 15A and 15B of second structure 9 and when second opposing pair of convex rails 14A and 14B of first structure 2 are aligned with second opposing pair of rail guide recesses 16A and 16B of second structure 9. At least a portion of the second structure 9 is retained within compartment 10 of first structure 2 when second structure 9 slidably traverses at least a portion of the length of first structure 2.

It is within the scope of this current invention for outer wall surface 17 of second structure 9 to not contact inner wall surface 11 of first structure 2 when second structure 9 is installed within first structure 2 except for at least two of the four areas of contact. FIG. 5 best shows the first area of contact at convex rail 13B and rail guide recess 15B. A second area of contact is shown at convex rail 14B and rail guide recess 16B. If sliding track assembly 1 was mounted at a different angle, gravity would contribute to a third area of contact being at convex rail 13A and rail guide recess 15A. A fourth area of contact is shown at convex rail 14A and rail guide recess 16A. Depending on the mounting surface of novel sliding track assembly 1, a combination of contact areas may form from these 4 areas.

In another example, FIG. 6 illustrates novel sliding track assembly 1 being mounted in such a way that contact areas form at all 4 points of 13A and 15A, 13B and 15B, 14A and 16A, and 14B and 16B. The low friction sliding track assembly 1 is required to have at least two points of contact for proper operation. The drag associated with the friction of at least two areas of contact of the novel slide track assembly 1 is greatly reduced in comparison with the drag associated with the friction of the entire length of sliding track as seen in current sliding track systems.

FIGS. 7-11 best show first structure 2 having openings 20A and 20B that receive a fastener (not shown) including, but not limited to, a screw. In an example, first structure 2 can be mounted to an anchoring structure (not show) such as a wall, when first structure 2 is places against the wall and the screws are inserted through openings 20A and 20B and into the wall. The second structure 9 is free to slidably traverse at least a portion of the length of the first structure 2. In another example, second structure 9 can be mounted to an anchoring structure such as a drawer when the drawer is places against mounting leg 12 of second structure 9 and the screws are inserted through openings 21A and 21B and into the drawer. Second structure 9 has openings 21A and 21B that are positioned through mounting leg 12.

FIG. 9 illustrates sliding track assembly 1 having second structure 9 configured to slidably traverse at least a portion of a length of first structure 2 when first opposing pair of convex rails 13A and 13B of first structure 2 are aligned 22C with first opposing pair of rail guide recesses 15A and 15B of second structure 9 and when second opposing pair of convex rails 14A and 14B of first structure 2 are aligned 22A with second opposing pair of rail guide recesses 16A and 16B of second structure 9. Mounting leg 12 is aligned 22B with second opening 4 of first structure 2. FIGS. 9-10 show compartment 10 of first structure 1 has central portion 19A and end portions 19B and 19C.

Figure 11:
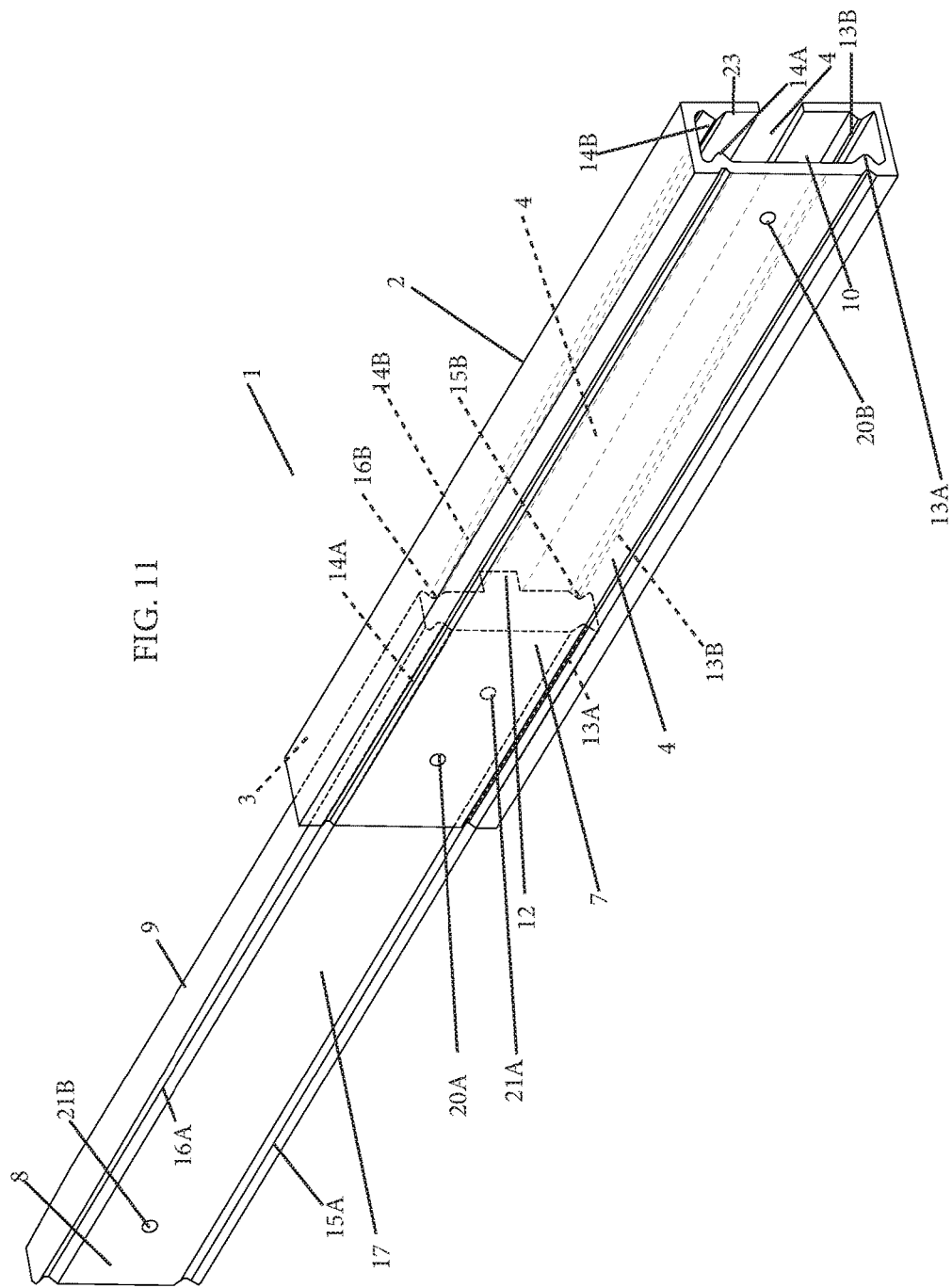
FIG. 11 is perspective view of the inter-relation of the novel sliding track assembly having an end of the second structure being aligned with the compartment first opening of the first structure and the mounting leg of the second structure being aligned with the second opening of the first structure.

FIGS. 10-11 depict novel sliding track assembly 1 having second structure 9 slidably traverse at least a portion of a length of first structure 2 when first opposing pair of convex rails 13A and 13B of first structure 2 are aligned with first opposing pair of rail guide recesses 15A and 15B of second structure 9 and when second opposing pair of convex rails 14A and 14B of first structure 2 are aligned with second opposing pair of rail guide recesses 16A and 16B of second structure 9. At least a portion of the second structure 9 is retained within compartment 10 of first structure 2 when second structure 9 slidably traverses at least a portion of the length of first structure 2. FIG. 11 best shows first structure 2 can have first opening 3 located opposite third opening 23.

FIG. 12 illustrates an alternate embodiment of sliding track assembly 1 in which second structure 9 does not have mounting leg 12 protruding through opening 4 of first structure 2. First structure 2 has first flange 18A and second flange 18B bordering second opening 4 of first structure 2. FIGS. 12-13 show second structure 9 having opening 21 configured to receive 53 a fastener 24 (FIG. 13). Fastener 24 is configured to lock secondary structure 9 at a desired position along the length of first structure 2. Fastener 24, when penetrating through both openings 20B and 21A (FIG.

11), can also connect novel sliding track assembly 1 to an anchoring structure (not shown).

FIG. 13 depicts another alternate embodiment of novel sliding track assembly 1 in which secondary structure 9 is connected to t-mount leg 25. T-mount leg 25 has first protrusion 26 located opposite second protrusion 27. Opening 21 of t-mount leg 25 and secondary structure 9 receive 53 fastener 24 when mounting sliding track assembly 1 onto anchoring structure (not shown).

Figure 14:
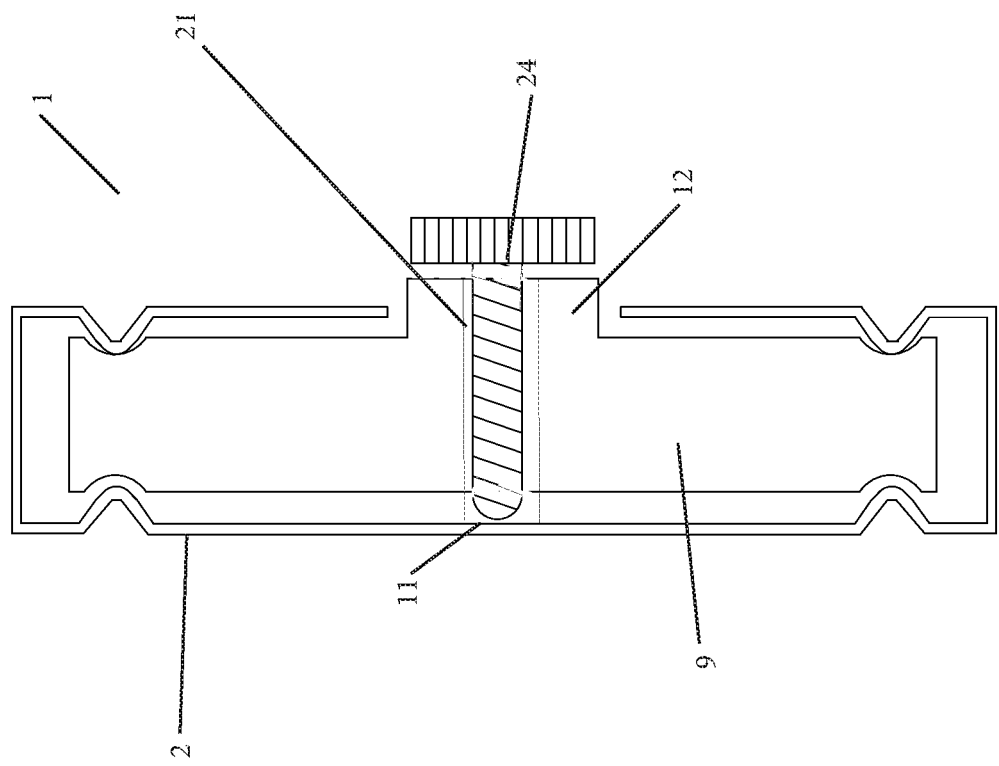
FIG. 14 is a side cut-away view of the novel sliding track assembly having the second structure with a mounting leg and a fastener being retained within the compartment of the first structure.

FIG. 14 illustrates the embodiment of FIG. 5 in which novel sliding track assembly 1 has secondary structure 9 having opening 21 retaining fastener 24. Fastener 24 is configured to lock secondary structure 9 at a desired position along the length of first structure 2 when an end of fastener 24 is in contact with inner wall surface 11 of first structure 2. The force applied to the inner wall surface 11 of structure 2 from fastener 24 prevents the secondary structure 9 from being able to slidably traverse along the length of first structure 2.

Figure 15:
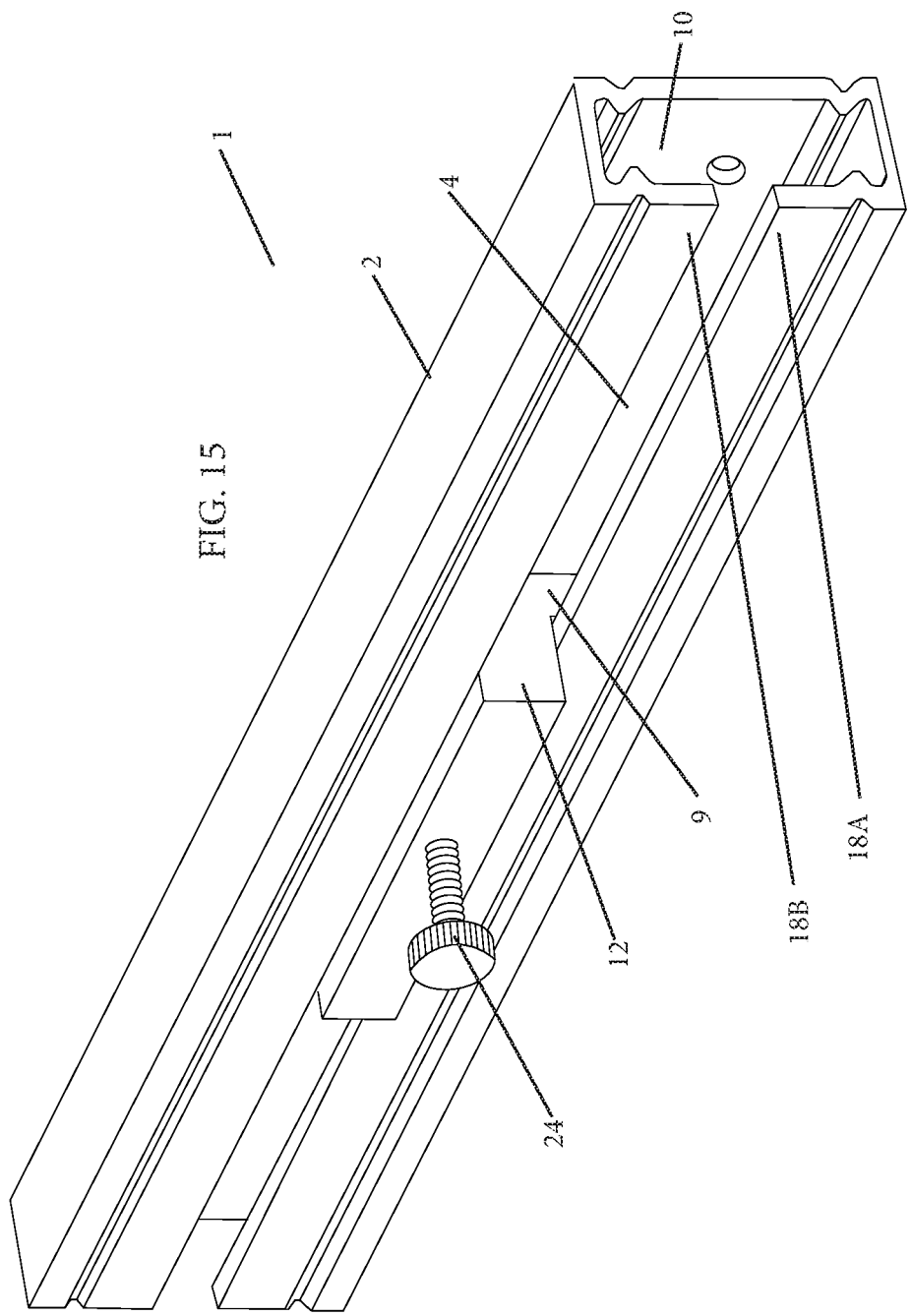
FIG. 15 is a rear perspective view of the novel sliding track assembly having the second structure with a mounting leg and a fastener being retained within the compartment of the first structure.

FIG. 15 shows novel sliding track assembly 1 having fastener 24 connected to mounting leg 12 of secondary structure 9. Mounting leg 12 protrudes from second opening 4 of first structure 2. Secondary structure 2 is retained within chamber 10 of first structure 2 by first flange 18A and second flange 18B.

Figures 16, 17:
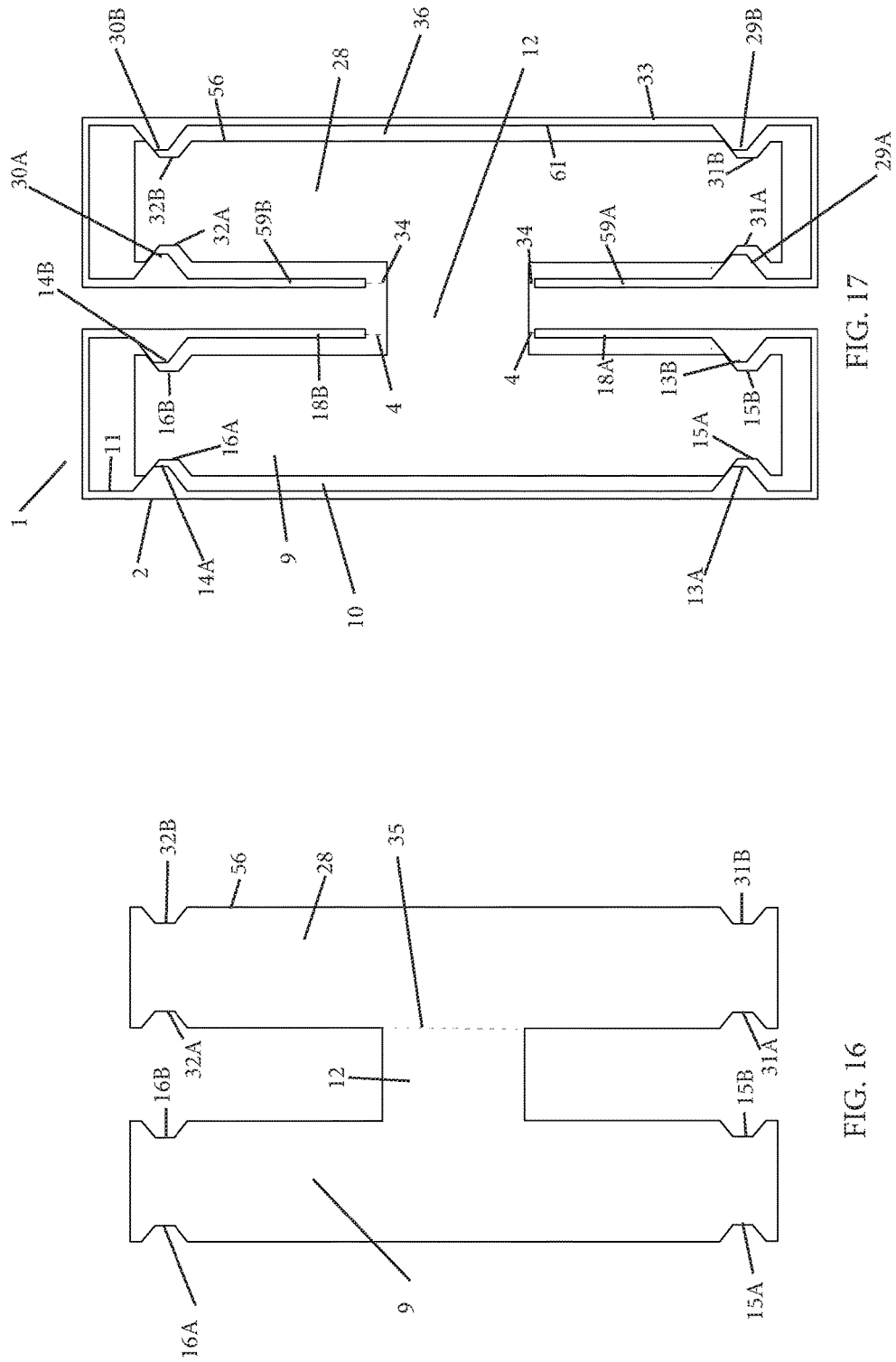
FIG. 16 is a side cut-away view of the second structure being connected to a third structure.
FIG. 17 is a side cut-away view of the novel sliding track assembly having the second structure connected to a third structure and the second structure is being retained within the compartment of the first structure and the third structure is being retained within the compartment of the fourth structure.

FIG. 16 shows an alternate embodiment of secondary structure 9 of novel sliding track assembly 1. Secondary structure 9 has mounting leg 12 with an end 35. End 35 of mounting structure 12 is connected to third structure third structure 28. Third structure 28 is a duplication of second structure 9. FIG. 17 illustrates third structure 28 is integrally formed with second structure 9 into one piece.

Figure 18:
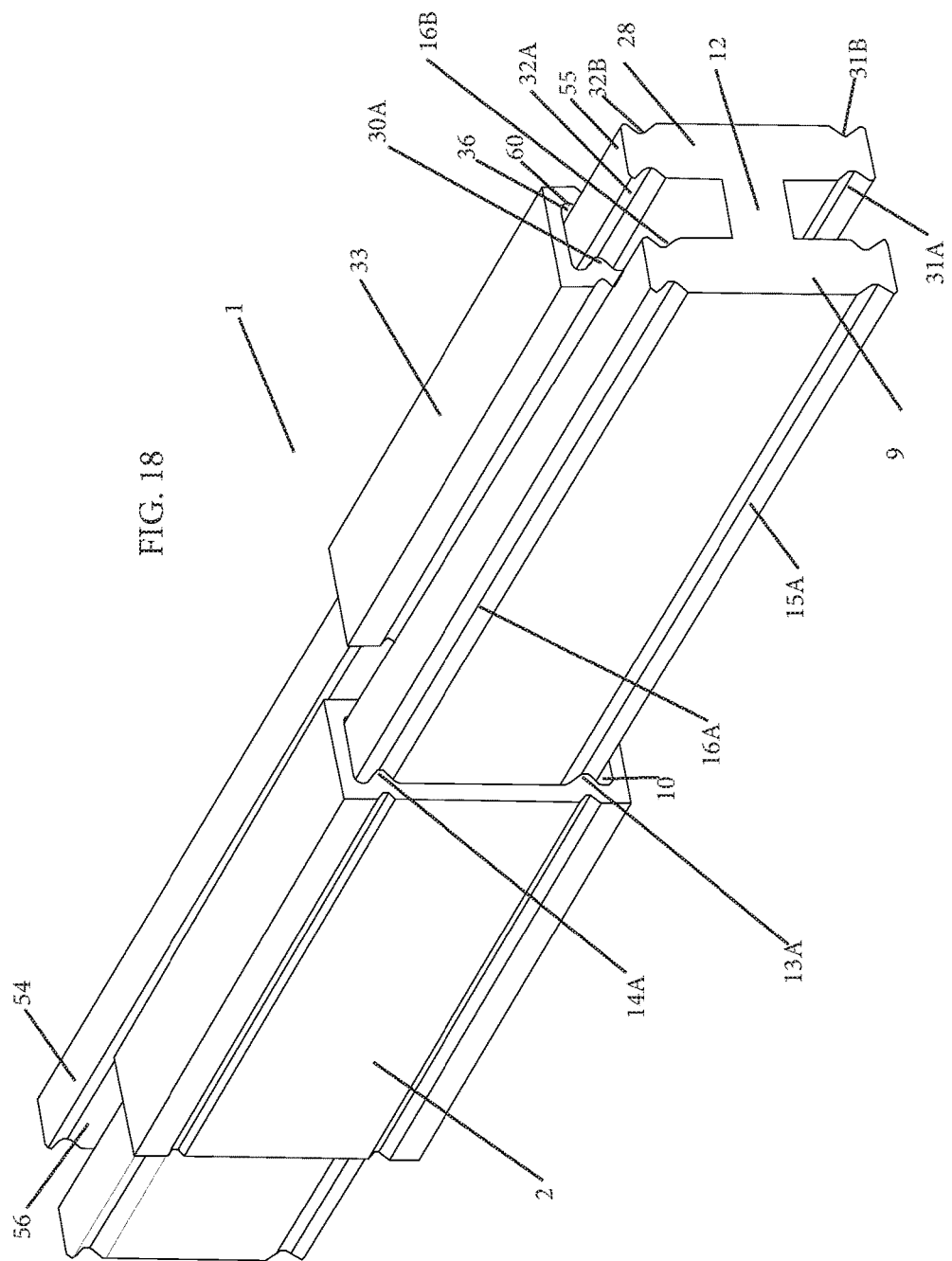
FIG. 18 is a perspective view of the novel sliding track assembly having the second structure connected to a third structure and the second structure is being retained within the compartment of the first structure and the third structure is being retained within the compartment of the fourth structure.

As illustrated in FIGS. 16-18, third structure 28 has a third opposing pair of rail guide recesses 31A and 31B that are located on an outer wall surface 56 of the third structure 28. A fourth opposing pair of rail guide recesses 32A and 32B are located on the outer wall surface 56 of the third structure 28.

FIGS. 17-18 best depict fourth structure 33 having a first end 57 located opposite a second end 58. The fourth structure has a compartment 36. Compartment 36 of fourth structure 33 has a first opening 60 (FIG. 18) located on at least one end of fourth structure 33. Fourth structure 33 has second opening 34 (FIG. 17). Compartment 36 of fourth structure 33 has inner wall surface 61 (FIG. 17). A third opposing pair of convex rails 29A and 29B (FIG. 17) are connected to inner wall surface 61 of compartment 36 of fourth structure 33. A fourth opposing pair of convex rails 30A and 30B 9 (FIG. 17) are connected to inner wall surface 61 of compartment 36 of fourth structure 33.

FIG. 18 illustrates first opening 60 of fourth structure receives an end of third structure 28. Third structure 28 slidably traverses at least a portion of a length of fourth structure 33 when third opposing pair of convex rails 29 A and 29B of fourth structure 33 are aligned with third opposing pair of rail guide recesses 31A and 31B of third structure 28 and when fourth opposing pair of convex rails 30A and 30B of fourth structure 33 are aligned with fourth opposing pair of rail guide recesses 32A and 32B of third structure 28. At least a portion of third structure 28 is retained within compartment 36 of fourth structure 33 when third structure 28 slidably traverses at least a portion of the length of fourth structure 33.

FIG. 17 best illustrates fourth structure 33 having first flange 59A bordering at least a portion of second opening 34 of fourth structure 33. First flange 59A is located opposite second flange 59B. Second flange 59B borders at least a portion of second opening 34 of the fourth structure.

FIG. 18 best illustrates third structure 28 having a first end 54 located opposite a second end 55. Third structure 28 has outer wall surface 56.

Figure 19:
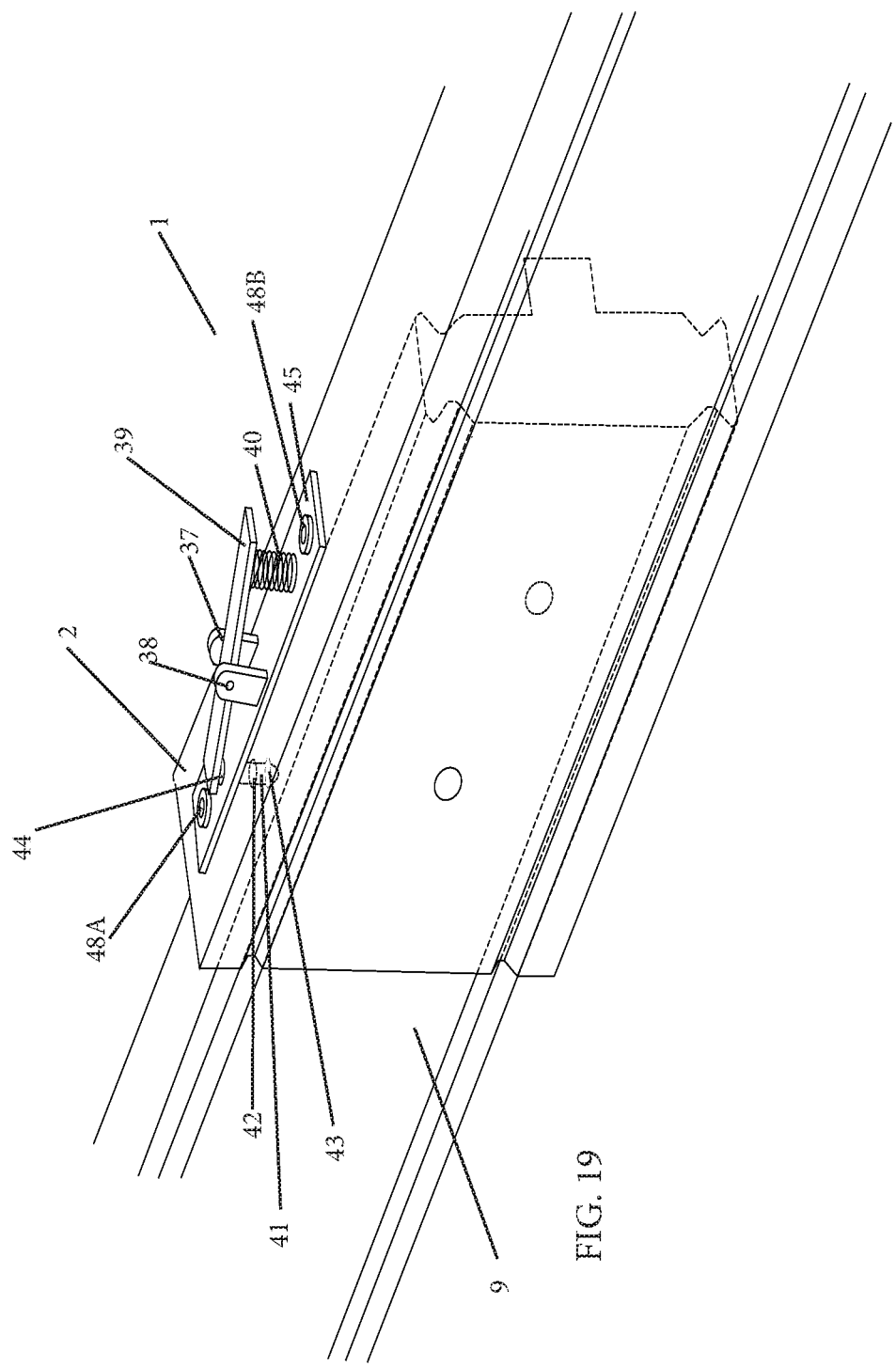
FIG. 19 is a perspective view of the novel sliding track assembly having a lock mechanism having a lever hingedly pivotable at a fulcrum point.

FIG. 19 shows an alternate embodiment of novel sliding track assembly 1 having lock mechanism 37 connected thereto. Lock mechanism can have lever 39 connected to first structure 2. Lever 39 is hingedly pivotable at fulcrum point 38. A first end of lever 39 is connected to resilient member 40 including, but not limited to, a spring. A second end of lever 39 is connected to protrusion 41. First structure 2 has protrusion receiving opening 42 aligned with protrusion receiving opening 43 of second structure 9, whereby, lock mechanism 37 is oriented in a locked orientation (FIG. 19) when protrusion 41 is received by protrusion receiving opening 42 of first structure 2 and protrusion receiving opening 43 of second structure 9. Novel sliding track assembly 1 is oriented in an unlocked orientation when lever 39 is depressed (not shown), thereby, removing protrusion 41 from protrusion receiving opening 42 of first structure 2 and from protrusion receiving opening 43 of second structure 9. Lock mechanism 37 can be connected to a mounting plate 45. Mounting plate 45 has opening 44. Mounting plate is connected to first structure 2 with fastener 48 A and 48B. Opening 44 is located in alignment with protrusion 41 of lock mechanism 37. Protrusion 41 passes through opening 44 when lock mechanism 37 is engaged in a locked configuration.

Figure 20:
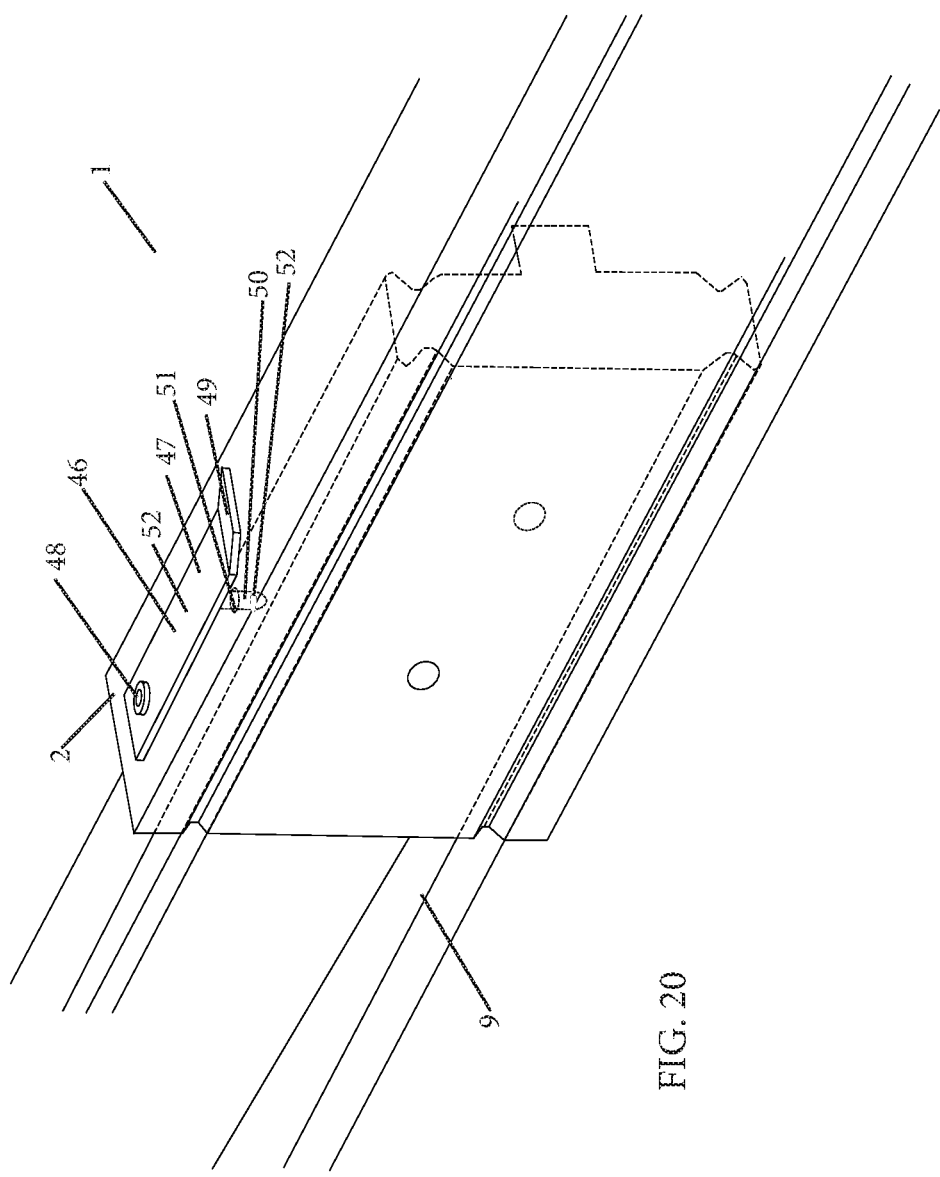
FIG. 20 is a perspective view of the novel sliding track assembly having a lock mechanism having a latch connected to the first structure with a fastener; and, FIG. 21 is a perspective view of an alternate embodiment of the novel sliding track assembly having a second structure and a first structure.

FIG. 20 illustrates an alternate embodiment of sliding track assembly 1 in which sliding track assembly 1 has lock mechanism 46 connected thereto. Lock mechanism 46 can have plate 52 being a latch 47. A first end of plate 52 is connected to first structure 2 by fastener 48 including, but not limited to, a screw. A second end of plate 52 has a handle 59 or grasping portion. Plate 52 is connected to protrusion 50. First structure 2 has protrusion receiving opening 51 aligned with protrusion receiving opening 52 of second structure 9. Lock mechanism 46 is oriented in a locked orientation (FIG. 20) when protrusion 50 is received by protrusion receiving opening 51 of first structure 2 and protrusion receiving opening 52 of second structure 9. Lock mechanism 46 is oriented in an unlocked orientation when handle 49 of plate 52 is raised, thereby, removing protrusion 50 from protrusion receiving opening 51 of first structure 2 and from protrusion receiving opening 52 of second structure 9.

FIG. 21 is an alternate embodiment of FIG. 17 without flanges 18. In particular, unlike for example, FIG. 17, first structure 2 does not have first flange 18A and second flange 18B bordering second opening 4 of first structure 2. FIG. 21 illustrates, first structure 1 having first opposing pair of convex rails 13A and 13B and a second opposing pair of convex rails 14A and 14B. This embodiment orients mounting leg 12 in either end portion 19B or 19C of compartment 10 and through second opening 4 at a location on an end of first structure 2. This orientation is can be applied for example, to the installation of a shower door. In this particular embodiment, the orientation is effective when first structure 2 does not have flanges 18 because mounting leg in FIG. 21 has a width great enough in length to conform to the end portion 19B or 19B of compartment 10, yet being able to slidably traverse the length of secondary track 9. Second structure 9 has a first opposing pair of rail guide recesses 15A and 15B being located on an outer wall surface 17 of second structure 9. A second opposing pair of rail guide recesses 16A and 16B are located on an outer wall surface 17 of second structure 9.

It is within the scope of this invention for opening 4 to be located between end portions 19A and 19B of compartment 10 as best illustrated in FIGS. 1, 3, 5, 7-15, 17, 18, and 19. Alternatively, opening 4 can be positioned at either end portions 19A and 19B of compartment 10 as best illustrated in FIGS. 6 and 21. FIG. 6 shows primary structure 2 having flanges 18A and 18B with secondary structure 9 having mounting leg 12 having a stepped portion 62A and 62B that makes mounting leg 12 have a smaller width than the width between pair of opposing recesses 16A and 16B or 15A and 15B of second structure 9. This mounting leg 12 has a smaller width than the width of second structure 9 and allows the second structure 9 to both engage and slidably traverse the recess/rail track and yet be stabilized further between flanges 18A and 18B.

FIG. 21 has first structure 2 with no flanges 18A and 18B. Although there are no flanges 18A or 18B present in this embodiment, the fact that mounting leg 12 has a width substantially the same as the remaining portions of second structure 9, with the exception of recesses 15 and 16, the mounting leg 12 has minimal side-to-side movement within end portion 19C of compartment 10 of first structure 2 when secondary structure 9 slidably traverses at least a portion of a length of compartment 10 of first structure 2.

It is also within the scope of this invention for at least one first structure 2 and at least one second structure 9 form the slide track assembly 1 as best shown in FIGS. 1-12, 14, 15, and 19-21. It is within the scope of this invention for a plurality or an array of first structures 9 and 33 to be duplicated and a plurality of secondary structures 9 and 28 to be duplicated to interconnect as best illustrated in FIGS. 13, and 16-18, thereby, forming novel sliding track assembly 1.

It will be seen that the advantages set forth above, and those made apparent from the foregoing description, are efficiently attained and since certain changes may be made in the above construction without departing from the scope of this invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be the to fall there between.

Now that the invention has been described,

The invention claimed is:

1. A sliding track assembly, comprising:
   a first structure having a first end located opposite a second end, said first structure having a compartment, said compartment having a first opening, said first opening is located on at least one of said ends of said first structure, said compartment having an inner wall surface;
   a second structure having a first end located opposite a second end, said second structure having an outer wall surface;
   a first opposing pair of convex rails are connected to said inner wall surface of said compartment of said first structure;
   a second opposing pair of convex rails are connected to said inner wall surface of said compartment of said first structure;
   a first opposing pair of rail guide recesses are located on said outer wall surface of said second structure;
   a second opposing pair of rail guide recesses are located on said outer wall surface of said second structure;
   said first opening of said first structure receives an end of said second structure, said second structure slidably traverses at least a portion of a length of said first structure when said first opposing pair of convex rails of said first structure are aligned with said first opposing pair of rail guide recesses of said second structure and when said second opposing pair of convex rails of said first structure are aligned with said second opposing pair of rail guide recesses of said second structure, at least a portion of said second structure is retained within said compartment of said first structure when said second structure slidably traverses said at least a portion of said length of said first structure; and,
   a lock mechanism connected thereto, said lock mechanism having a lever connected to said first structure, said lever is hingedly pivotable at a fulcrum point, a first end of said lever is connected to a resilient member, a second end of said lever is connected to a protrusion, said first structure having a protrusion receiving opening aligned with a protrusion receiving opening of said second structure, whereby, said sliding track assembly is oriented in a locked orientation when said protrusion is received by said protrusion receiving opening of said first structure and said protrusion receiving opening of said second structure, said sliding track assembly is oriented in an unlocked orientation when said lever is depressed, thereby, removing said protrusion from said protrusion receiving opening of said first structure and from said protrusion receiving opening of said second structure.

2. The sliding track assembly of claim 1, further comprising:
   said second structure having a mounting leg, said mounting leg protruding from said outer wall surface of said second structure.

3. The sliding track assembly of claim 1, further comprising:
   said first structure having a second opening.

4. The sliding track assembly of claim 3, further comprising:
   said first structure having a first flange, said first flange bordering at least a portion of said second opening, said first flange is located opposite a second flange, said second flange bordering at least a portion of said second opening.

5. The sliding track assembly of claim 4, further comprising:
   said second structure having a mounting leg, said mounting leg protrudes from said outer wall surface of said second structure, said mounting leg is positioned between said first flange of said first structure and said second flange of said first structure when said second structure is received by said first opening of said first structure, at least a portion of said mounting leg protrudes from said second opening of said first structure.

6. The sliding track assembly of claim 5, further comprising:
   said mounting leg of said second structure is connected to a third structure, said third structure having a first end located opposite a second end, said third structure having an outer wall surface, a third opposing pair of rail guide recesses are located on an outer wall surface of said third structure, a fourth opposing pair of rail guide recesses are located on said outer wall surface of said third structure.

7. The sliding track assembly of claim 6, further comprising:
a fourth structure having a first end located opposite a second end, said fourth structure having a compartment, said compartment of said fourth structure having a first opening, said first opening is located on at least one end of said fourth structure, said fourth structure having a second opening, said compartment having an inner wall surface, a third opposing pair of convex rails are connected to said inner wall surface of said compartment of said fourth structure, a fourth opposing pair of convex rails are connected to said inner wall surface of said compartment of said fourth structure, said first opening of said fourth structure receives an end of said third structure, said third structure slidably traverses at least a portion of a length of said fourth structure when said third opposing pair of convex rails of said fourth structure are aligned with said third opposing pair of rail guide recesses of said third structure and when said fourth opposing pair of convex rails of said fourth structure are aligned with said fourth opposing pair of rail guide recesses of said third structure, at least a portion of said third structure is retained within said compartment of said fourth structure when said third structure slidably traverses said at least a portion of said length of said fourth structure, said fourth structure having a first flange, said first flange bordering at least a portion of said second opening of said fourth structure, said first flange is located opposite a second flange, said second flange bordering at least a portion of said second opening of said fourth structure.

8. The sliding track assembly of claim 4, further comprising:
said second structure having a t-mount leg, said t-mount leg protrudes from said outer wall surface of said second structure, said t-mount leg is positioned between said first flange of said first structure and said second flange of said first structure when said second structure is received by said first opening of said first structure, at least a portion of said t-mount leg protrudes from said second opening of said first structure, said t-mount leg having a first protrusion positioned adjacent to said first flange located opposite a second protrusion positioned adjacent to said second flange.

9. The sliding track assembly of claim 3, further comprising:
said first structure having a third opening, said third opening is located opposite said first opening of said first structure.

10. The sliding track assembly of claim 3, further comprising:
said second structure having a mounting leg, said mounting leg protrudes from said second opening of said first structure.

11. The sliding track assembly of claim 1, further comprising:
said first opposing pair of convex rails and said second opposing pair of convex rails are integrally formed within said first structure.

12. The sliding track assembly of claim 1, further comprising:
said compartment of said first structure having a central portion located between two end portions, said central portion of said compartment has a size greater than a size of each of said two end portions.

13. The sliding track assembly of claim 1, further comprising:
said first structure having at least one central bore, said at least one central bore of said first structure receives a removable fastener.

14. The sliding track assembly of claim 1, further comprising:
said second structure having at least one central bore, said at least one central bore of said second structure receives a removable fastener.

15. The sliding track assembly of claim 1, further comprising:
said first structure and said second structure being a plastic material.

16. The sliding track assembly of claim 1, further comprising:
said sliding track assembly being a plastic material.

17. The sliding track assembly of claim 1, further comprising:
said outer wall surface of said second structure does not contact said inner wall surface of said first structure when said second structure is installed within said first structure except for a first contact area located at a first convex rail of said first opposing pair of convex rails and at a first rail guide recess of said first opposing pair of rail guide recesses and for a second contact area located at a second convex rail of said second opposing pair of convex rails and at a second rail guide recess of said second opposing pair of rail guide recesses.

18. A sliding track assembly, comprising:
a first structure having a first end located opposite a second end, said first structure having a compartment, said compartment having a first opening, said first opening is located on at least one of said ends of said first structure, said compartment having an inner wall surface;
a second structure having a first end located opposite a second end, said second structure having an outer wall surface;
a first opposing pair of convex rails are connected to said inner wall surface of said compartment of said first structure;
a second opposing pair of convex rails are connected to said inner wall surface of said compartment of said first structure;
a first opposing pair of rail guide recesses are located on said outer wall surface of said second structure;
a second opposing pair of rail guide recesses are located on said outer wall surface of said second structure;
said first opening of said first structure receives an end of said second structure, said second structure slidably traverses at least a portion of a length of said first structure when said first opposing pair of convex rails of said first structure are aligned with said first opposing pair of rail guide recesses of said second structure and when said second opposing pair of convex rails of said first structure are aligned with said second opposing pair of rail guide recesses of said second structure, at least a portion of said second structure is retained within said compartment of said first structure when said second structure slidably traverses said at least a portion of said length of said first structure; and,
a lock mechanism connected thereto, said lock mechanism having a plate, a first end of said plate is connected to said first structure by a fastener, a second end of said plate having a handle, said plate is connected to a protrusion, said first structure having a protrusion receiving opening aligned with a protrusion receiving opening of said second structure, whereby, said sliding track assembly is oriented in a locked orientation when said protrusion is received by said protrusion receiving opening of said first structure and said protrusion receiving opening of said second structure, said sliding track assembly is oriented in an unlocked orientation when said handle of said plate is raised, thereby, removing said protrusion from said protrusion receiving opening of said first structure and from said protrusion receiving opening of said second structure.

19. A sliding track assembly, comprising:
- a first structure having a first end located opposite a second end, said first structure having a compartment, said compartment having a first opening, said first opening is located on at least one of said ends of said first structure, said compartment having an inner wall surface;
- a second structure having a first end located opposite a second end, said second structure having an outer wall surface;
- a first opposing pair of convex rails are connected to said inner wall surface of said compartment of said first structure;
- a second opposing pair of convex rails are connected to said inner wall surface of said compartment of said first structure;
- a first opposing pair of rail guide recesses are located on said outer wall surface of said second structure;
- a second opposing pair of rail guide recesses are located on said outer wall surface of said second structure;
- said first opening of said first structure receives an end of said second structure, said second structure slidably traverses at least a portion of a length of said first structure when said first opposing pair of convex rails of said first structure are aligned with said first opposing pair of rail guide recesses of said second structure and when said second opposing pair of convex rails of said first structure are aligned with said second opposing pair of rail guide recesses of said second structure, at least a portion of said second structure is retained within said compartment of said first structure when said second structure slidably traverses said at least a portion of said length of said first structure; and,
- said outer wall surface of said second structure does not contact said inner wall surface of said first structure when said second structure is installed within said first structure except for a first contact area located at a first convex rail of said first opposing pair of convex rails and at a first rail guide recess of said first opposing pair of rail guide recesses and for a second contact area located at a second convex rail of said second opposing pair of convex rails and at a second rail guide recess of said second opposing pair of rail guide recesses.

* * * * *